Nov. 17, 1964 R. N. HARRIS ETAL 3,157,213
ANIMAL CARCASS TRIMMING MACHINE
Filed Sept. 27, 1962
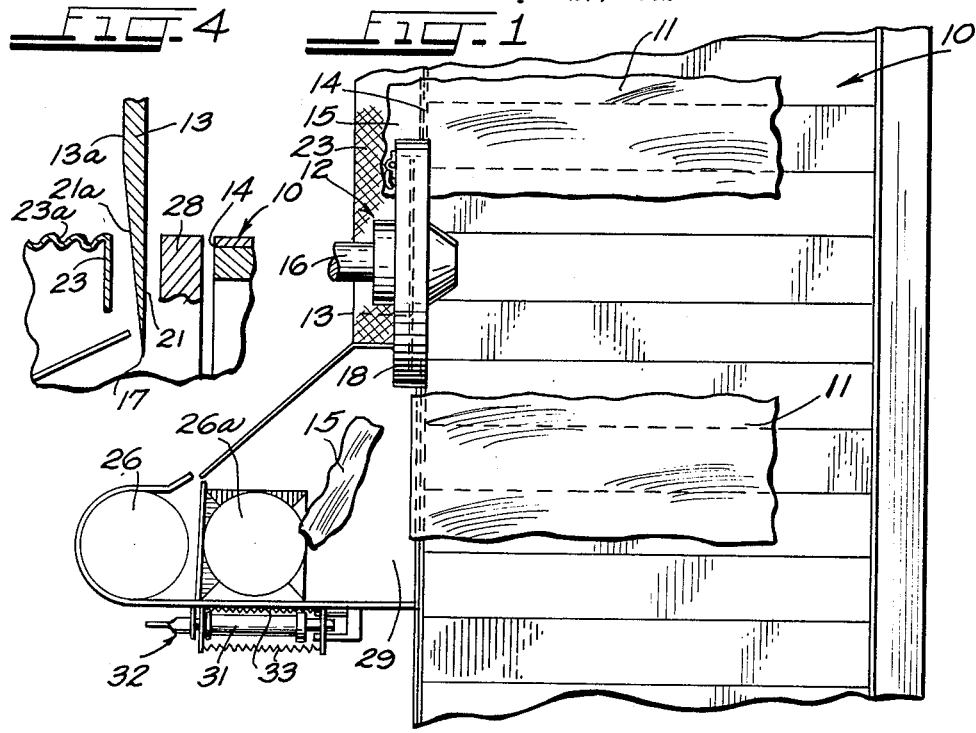
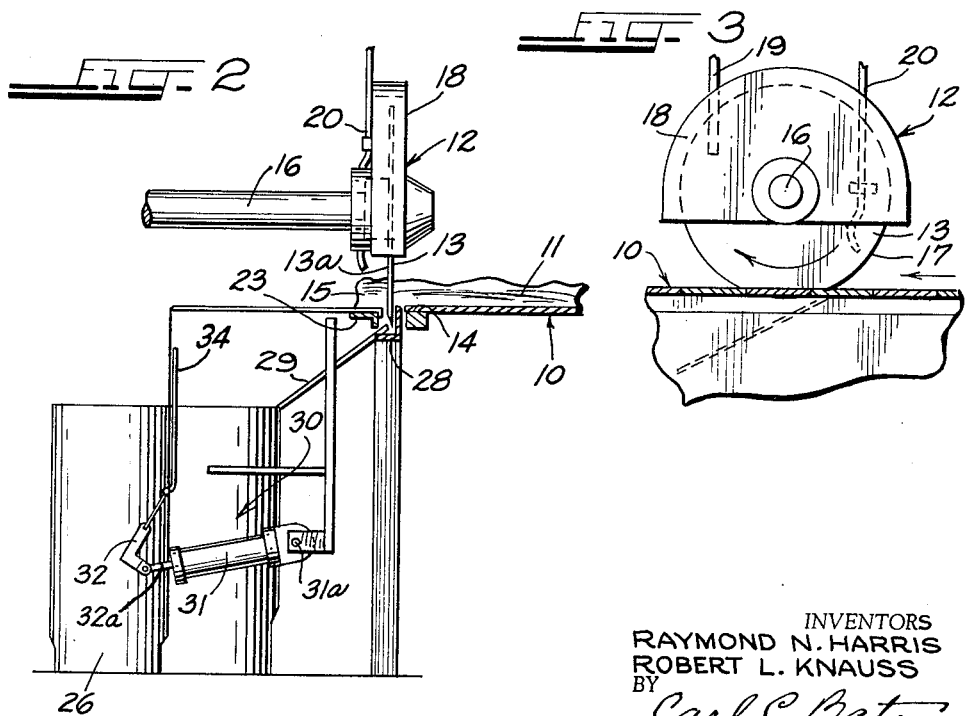
INVENTORS
RAYMOND N. HARRIS
ROBERT L. KNAUSS
BY
Carl C. Batz
ATTY.

United States Patent Office 3,157,213
Patented Nov. 17, 1964

3,157,213
ANIMAL CARCASS TRIMMING MACHINE
Raymond N. Harris, Omaha, and Robert L. Knauss, Council Bluffs, Iowa, assignors to Armour and Company, Chicago, Ill., a corporation of Delaware
Filed Sept. 27, 1962, Ser. No. 226,653
3 Claims. (Cl. 146—81)

This invention relates to an apparatus which is useful for severing pieces from animal carcasses, and which is particularly useful for trimming bootjacks and belly strips from a hog belly.

In processing hog belly halves for use as bacon, it has been the usual practice to trim the bellies manually with straight knives. Specifically, hog bellies are placed on a moving conveyor and a number of operators are positioned along the conveyor. As the bellies pass the operators, they are pulled from the conveyor and the particular pieces, specifically bootjacks and belly strips, are trimmed from the bellies by a straight knife. Such manual operations are quite expensive because of the labor and time required. It would clearly be advantageous if an apparatus could be provided for automatically trimming bootjacks and belly strips from hog bellies.

It is therefore an object of this invention to provide an apparatus for automatically severing pieces from animal carcasses.

It is another object of this invention to provide an apparatus for trimming belly strips and bootjacks from hog bellies.

It is also an object of this invention to provide an apparatus for trimming belly strips and bootjacks from hog bellies along a predetermined path of travel.

It is still a further object of this invention to provide a trimming apparatus which performs the trimming operation without substantial movement of the carcass portion which is being trimmed.

It is a further object of this invention to provide apparatus for conveniently recovering the trimmed pieces after the trimming operation is completed.

Further purposes and objects of the present invention will appear as the specification proceeds.

One embodiment of the present invention is illustrated in the accompanying drawings wherein:

FIG. 1 is a top plan view of the severing apparatus of the present invention;

FIG. 2 is a partially broken, end elevational view of the embodiment of FIG. 1;

FIG. 3 is a partially broken, side elevational view of the embodiment of FIG. 1; and FIG. 4 is an enlarged detail view, in section, showing the relationship between the cutting edge of the knife blade and the platform for supporting bootjacks and belly strips and the moving conveyor.

Generally, the present invention comprises a moving conveyor 10 for supporting and carrying animal carcass portions 11 and severing means, generally 12, having a knife 13 mounted beyond the edge 14 of the conveyor 10 whereby pieces 15 are trimmed from the carcass portions 11 by the rotary knife 13 as the conveyor 10 carries the carcass portions 11 past the knife 13.

The conveyor 10 may be any type that is suitable for continuously transporting a plurality of carcass portions 11. Ordinarily, a continuous flat belt or link conveyor, operating in a substantially horizontal plane, is preferred. Since any of a variety of available conveyors may be used in connection with the present invention, a further detailed description of the conveyor 10 is not believed to be necessary. As an example of a particularly useful type of conveyor, reference is directed to our co-pending patent application Serial No. 226,652.

The cutting means 12 preferably includes a circular or rotary knife 13 rotatably mounted and disposed in a plane transverse to, preferably substantially perpendicular to, the conveyor 10, and preferably substantially parallel to the edge 14 of the conveyor 10. The knife 13 is fixedly secured to a drive shaft 16, which is operably connected to a drive means (not shown) for rotating the shaft 16 and the knife blade 13. The cutting edge or outer diameter 17 of the knife 13 is positioned slightly below the upper surface of the conveyor 10 so that the knife 13 cuts through the entire thickness of the belly portion 11. Since it is usually desirable that a substantially straight cut be provided on the belly portion 11, the knife blade 13 is sharpened on the side 13a which is furthest from the conveyor 10. Since only side 13a is sharpened, the cutting edge 17 is formed by the slanted or inclined surface 21a on side 13a and by the substantially flat surface 21 of blade 13. By having only one inclined surface 21a on the blade 13, there is an added advantage since the meat trimming 15 is naturally turned or directed away from the blade 13 and the conveyor 10.

The linear speed of the cutting edge or outer diameter 17 of the knife 13 and the linear speed of the conveyor 10 are synchronized so that while rotating the blade 13 initially enters and is moving through the carcass portion 11, the portion 11 will remain substantially stationary and will not move out of position from the force exerted by the knife passing through the portion 11. In other words, the weight of the meat portion 11 is sufficient to maintain the portion 11 in position on the conveyor 10 as the severing operation progresses. It is preferable that the linear speed of the periphery 17 of the knife 13 range from about 380 to 460 feet per minute and that the conveyor speed range from about 65 to about 85 feet per minute. Particularly good results are achieved when the peripheral speed of the knife 13 is about 420 feet per minute and when the conveyor speed is about 75 feet per minute. Since the peripheral speed of the blade 13 depends upon both the rotational speed and the diameter of the blade 13, it has been found that a 20" diameter blade, operating at about 80 r.p.m., provides excellent results.

Preferably, means are provided for lubricating the knife 13 before the blade 13 begins trimming the carcass portion 11 in order to assist in maintaining the carcass portion 11 relatively stationary with respect to the conveyor during the trimming operation. Conveniently, lubrication is provided by steam which is passed directly into the knife guard or jacket 18 through the tube 19 which communicates with a source of steam (not shown). Also, a second tube 20 carrying steam, is provided and continuously directs or jets steam directly on a portion of the inclined surface 21a of the rotating knife blade 13 shortly before that portion of the blade 13 enters the meat piece 11. As illustrated in FIG. 3, the rotation of the knife 13 and the movement of the conveyor 10 are in the same direction, so that the force imparted to the meat piece 11 by the knife 13 assists in maintaining the meat piece 11 in substantial contact with the conveyor 10.

The combination of lubricating the knife 13, synchronizing the speed of the blade 13 with the speed of the conveyor 10, and moving knife blade 13 and the conveyor 10 in the same direction enables the meat portion 11 to remain relatively stationary on the conveyor 10 during the cutting operation. It is important that the carcass portion 11 remain on the conveyor 10 in a relatively stationary position since the knife 13 is to perform the severing operation, along a predetermined path of severence, without any substantial variance.

It is also preferred that a shelf or platform 23 be mounted in close proximity to and in substantially the same plane as the moving conveyor 10 for supporting the piece 15 during the cutting operation. The piece 15 slides along the shelf 23 during the cutting operation, and, upon completion of the cutting operation, is directed into chute 26 or 26a. In order for the piece 15 to move along the shelf 23 with a minimum of frictional resistance, it is preferred that the shelf 23 be dimpled so that there is minimum surface area in contact with the piece 15. Since a dimpled surface 23a has depressions, there is reduced mutual contact between the platform 23 and the pieces 15. The reduced mutual contact provides a corresponding decrease in frictional resistance to the movement of the pieces 15 along the shelf 23.

As illustrated in the drawings, a guard member 28 is provided to substantially eliminate any possibility of the conveyor 10 striking the knife blade 13 and is advantageously mounted closely adjacent to both the conveyor 10 and the blade 13.

It has been found to be particularly important that the knife 13 be mounted beyond the edge 14 of the conveyor 10. By mounting the knife blade 13 beyond, and preferably in close proximity to the edge 14 of the conveyor 10, a convenient method is provided for recovering the pieces 15 after trimming. The pieces 15 slide along the shelf 23, drop on the inclined surface 29 and are directed into either chute 26 or 26a. Mounting the blade 13 beyond and preferably in close proximity to the edge 14 of the conveyor 10 has the additional advantage of substantially eliminating the possibility of the knife blade 13 striking the conveyor 10 or the guard 28. By mounting the knife 13 in such a way, the expense and disadvantage of grooved flights on a conveyor 10 are avoided. The disadvantage of grooved flights is that a knife must be aligned with the grooves on the flights and if the conveyor or the knife become misaligned, the knife will strike the flights and will damage both the knife and the conveyor. Since the present invention substantially eliminates relative movement of the carcass portion 11 to the conveyor movement during the trimming operation, it is unnecessary to use flights on the conveyor 10.

Therefore, it is seen that the mounting of the knife blade 13 beyond the edge 14 of the conveyor 10 has a twofold advantage in substantially eliminating damage to the blade 13 and the conveyor 10 and in providing a convenient method for recovering the severed bootjacks and belly strips 15. This twofold advantage is possible because the carcass portion 10 remains substantially stationary while being trimmed.

Advantageously, means 30 are provided for directing the pieces 15 into either chute 26 or chute 26a. This is accomplished by air cylinder 31, pivotly mounted at 31a, which, through shaft 32a, and linkage member 32, causes a cover or lid 34 to be moved into a vertical position so the pieces 15 fall into chute 26a. Springs 33 move the cover 34 into the same plane as inclined surface 29 so the pieces 15 fall into chute 26. The apparatus 30 for directing pieces 15 into either chute 26 or 26a is particularly useful for separating skin-on from skin-off trimmings 15 when the belly portions 11 on the conveyor 10 are a mixture of skin-on and skin-off bellies. Therefore, an operator may direct the trimmings 15 into the desired chute, 26 or 26a, by actuating the air cylinder 31 by any suitable means (not shown).

In operation, a belly portion 11 is aligned on the conveyor 10. Specifically, an operator aligns the belly piece 11 with a light line or shadow line which is aligned with the knife 13. The operator positions the belly so that the line is at the desired place for trimming. The belly portion 11 is carried by the conveyor 10 towards the rotary knife 13 and the portion to be trimmed 15 slides along the shelf 23. Since the speed of the conveyor 10 is synchronized with the speed of the rotary knife 13, since the blade 13 is lubricated by steam directed through tubes 19 and 20, and since the rotation of the blade 13 and the movement of the conveyor 10 are in the same direction, the meat portion 11 remains in a relatively stationary position on the conveyor 10 during the trimming operation. As the cutting operation proceeds the belly portion 11 is moved past the rotating blade 13 on the conveyor 10 and the bootjack or belly strip 15 slides on the platform 23 until the operation is completed and then the trimmed piece 15 drops on the inclined surface 29 and is directed into either chute 26 or 26a depending upon the position of the lid 34.

From the above description, it is seen that a highly efficient meat trimming apparatus is provided. The invention provides substantial savings in both time and labor, and such savings are possible because the present apparatus enables bootjacks and belly strips to be trimmed from hog bellies along a predetermined path of travel while at the same time the trimmed pieces are recovered in a convenient manner.

While in the foregoing specification there has been a detailed description of one embodiment of the present invention, it is to be understood that all equivalents obvious to those skilled in the art are to be included within the scope of the invention as claimed.

We claim:

1. In apparatus for severing pieces from an animal carcass portion, a conveyor for supporting and carrying said carcass portion, a stationary platform mounted adjacent an edge of said conveyor and spaced therefrom, a circular knife supported for rotary movement and having its cutting edge between said conveyor and platform and spaced from said conveyor, and means for moving said conveyor and rotating said rotary knife, said platform having its top surface aligned with the top surface of said conveyor to support an edge portion of the carcass portion and being provided with longitudinal depressions for reducing friction.

2. The apparatus of claim 1 in which said rotary knife is substantially flat on the side adjacent the conveyor but is inclined inwardly and downwardly on the side away from the conveyor for directing said edge portion after being severed away from the knife and toward said platform.

3. In apparatus for severing pieces from hog bellies, a substantially flat, moving conveyor for supporting and carrying said bellies, a stationary platform on one side of said conveyor in spaced relation thereto and in substantially the same plane as said moving conveyor, said platform being adapted to receive an edge portion of said bellies and having its surface provided with depressions for reducing friction, a circular knife rotatably mounted between said platform and said moving conveyor, means for moving said conveyor at a speed of about 65–75 feet per minute and for rotating said circular knife in the same direction as said conveyor and at a peripheral speed of about 380–460 feet per minute so that the bellies remain relatively stationary on the conveyor during the knife-cutting operation.

References Cited in the file of this patent

UNITED STATES PATENTS

| | | |
|---|---|---|
| 2,229,896 | Matthiessen | Jan. 28, 1941 |
| 2,673,583 | Skog | Mar. 30, 1954 |
| 2,779,368 | Lorimer et al. | Jan. 29, 1957 |
| 2,839,113 | Townsend | June 17, 1958 |
| 3,013,596 | Ashlock | Dec. 19, 1961 |
| 3,073,366 | Sawyer et al. | Jan. 15, 1963 |